United States Patent [19]

Wenzel et al.

[11] Patent Number: 5,553,683

[45] Date of Patent: Sep. 10, 1996

[54] VARIABLE ASSIST POWER STEERING SYSTEM WITH ELECTRO-HYDRAULIC WORKING PRESSURE AND DIRECTIONAL PRESSURE CONTROL

[75] Inventors: Craig E. Wenzel, Menomonee Falls; Thomas J. Stobbs, Brookfield; James R. Ward, Milwaukee; all of Wis.

[73] Assignee: Applied Power Inc., Butler, Wis.

[21] Appl. No.: 376,181

[22] Filed: Jan. 20, 1995

[51] Int. Cl.⁶ .................................................. B62D 6/00
[52] U.S. Cl. ........................ 180/417; 180/421; 180/441; 91/459
[58] Field of Search ............................ 180/132, 141, 180/142, 148; 364/424.05; 251/129.08; 91/459

[56] References Cited

U.S. PATENT DOCUMENTS

| | | | |
|---|---|---|---|
| 4,643,227 | 2/1987 | Suzuki et al. | 251/129.08 X |
| 4,760,892 | 8/1988 | Duffy | 180/142 |
| 4,877,099 | 10/1989 | Duffy | 180/142 |
| 4,905,783 | 3/1990 | Bober | 180/142 |
| 4,926,956 | 5/1990 | Duffy | 180/142 |
| 5,232,195 | 8/1993 | Torrielli | 251/129.08 |
| 5,293,953 | 3/1994 | Edahiro | 180/132 |
| 5,307,892 | 5/1994 | Phillips | 180/79.1 |
| 5,328,147 | 7/1994 | Stobbs | 251/30.02 |
| 5,346,175 | 9/1994 | Hunnicutt | 251/129.08 |
| 5,377,720 | 1/1995 | Stobbs et al. | 137/625.65 |

FOREIGN PATENT DOCUMENTS

| | | | |
|---|---|---|---|
| 0427029 | 5/1991 | European Pat. Off. | 180/148 |

*Primary Examiner*—Kevin Hurley
*Assistant Examiner*—Victor E. Johnson
*Attorney, Agent, or Firm*—Quarles & Brady

[57] ABSTRACT

A variable assist power steering system for a motor vehicle has an electronically controlled working pressure valve which normally maintains a working pressure at a relief pressure but increases it in response to steering of the vehicle and according to vehicle status, such as vehicle speed. The system also has electronically controlled direction control valves which are actuated to selectively reduce the working pressure to one side or the other of the steering gear piston so as to match a measured handwheel torque with a value which is desired for the vehicle status.

4 Claims, 2 Drawing Sheets

VARIABLE ASSIST POWER STEERING SYSTEM WITH ELECTRO-HYDRAULIC WORKING PRESSURE AND DIRECTIONAL PRESSURE CONTROL

FIELD OF THE INVENTION

This invention relates to variable assist power steering systems for vehicles, and particularly to such systems which are electro-hydraulically controlled.

BACKGROUND OF THE INVENTION

Electro-hydraulically controlled variable assist power steering systems are known. For example, U.S. Pat. No. 4,760,892 describes such a system in which a variable degree of power assistance is provided to supplement the manual steering effort by controlling the magnitude of the steering pressure made available to a pressure operated motor by the vehicle's power steering pump. As described, the magnitude of the pressure is controlled by a central processing unit that responds to vehicle steering torque and vehicle speed to produce an appropriate steering pressure and power assist for all driving conditions.

However, in prior systems, a mechanical steering valve has been relied upon as the direction control valve for determining the degree of communication between the steering pressure and the hydraulic motor. This type of system has a number of limitations. For one thing, the mechanical steering valve has inherent in its operation a certain amount of backlash or a dead band in which, although the vehicle steering wheel may be turned, no power assist is provided. In addition, with mechanical valves, rapid turning of the steering wheel results in hydraulic shock loading of the mechanical and hydraulic components of the steering system. In addition, since the steering valves are mechanical rotary hydraulic control valves, their operational characteristics are not easily changeable so that it is difficult to tailor their characteristics to a particular vehicle, and the same valve may not be easily adaptable from one vehicle to a different type of vehicle.

SUMMARY OF THE INVENTION

The invention provides a variable assist power steering system for a motor vehicle which addresses these limitations. As in prior systems, a system of the invention has hydraulic motor means for moving in either of two directions in response to two hydraulic pressure inputs, one of the inputs being for moving the motor in one direction and the other input being for moving the motor in the other direction, and a source of hydraulic pressure for producing a source pressure. However, a system of the invention provides an electro-hydraulic working pressure valve and electro-hydraulic direction control valves. The working pressure valve is provided for reducing the source pressure to a hydraulic working pressure in a working pressure line and is actuable by an electrical signal input to increase the working pressure in response to steering by a driver of the vehicle. The direction control valves are provided with one for each motor input and are selectively actuable by an electrical signal input to control the magnitude of pressure communicated from the working pressure line to the corresponding motor input. A controller is provided to generate electrical signals to actuate the working pressure valve and the direction control valves.

With this system, the working pressure valve operates so as to relieve the source pressure to the relief pressure when no working pressure is required and to only increase it insofar as necessary, according to vehicle status such as vehicle speed and/or engine speed. This uses engine power efficiently, since no pressure is being generated when it is not needed and when it is needed, only the amount needed is generated. In addition, since all three valves are electronically controlled, the system can be easily adapted to have different characteristics, such as to change the steering characteristics on the same vehicle or to adapt the system to different vehicles. Thus, the characteristic deadband of a mechanical steering valve, can be programmed into the system and its bandwidth finely tuned, or it may be eliminated altogether. In addition, changes in the hydraulic pressures may be programmed to occur relatively gradually, although rapidly, so as to reduce hydraulic shocks to the steering system.

DETAILED DESCRIPTION OF THE PREFERRED EMBODIMENTS

Figure 1:
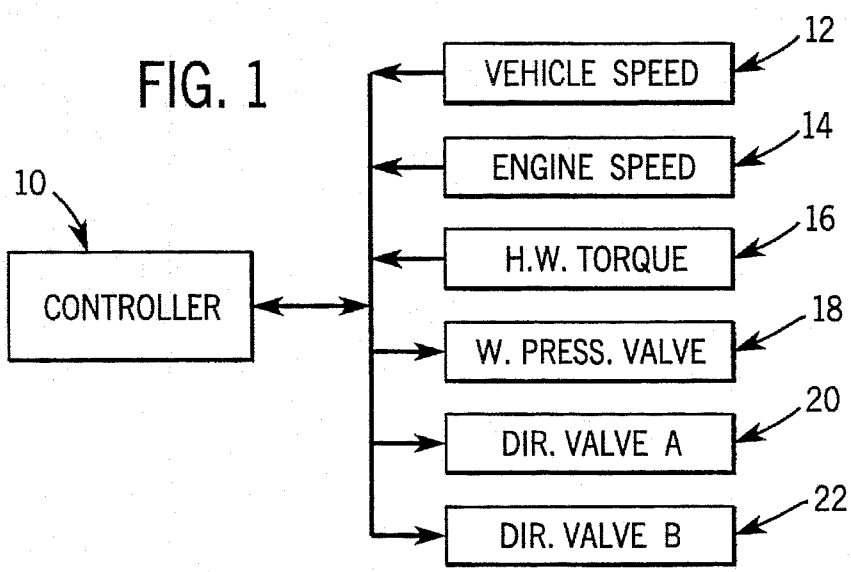
FIG. 1 is a block diagram schematically illustrating controls for a variable assist power steering system of the invention.

FIG. 1 illustrates a block diagram of a controller 10 and its inputs 12, 14 and 16 and outputs 18, 20 and 22. As inputs, the controller 10 receives vehicle speed 12, engine speed 14 and handwheel torque 16. Vehicle speed and engine speed are monitored by the electronic control units of current production vehicles so that the control system for a variable assist power steering system of the invention can simply tap into the existing vehicle monitoring system to obtain this input information. However, the electronic control systems of current production vehicles typically do not monitor handwheel torque, so it is necessary to add a torque sensor to the steering column linkage. This torque sensor must measure both the magnitude and direction of the applied handwheel torque. Such torque sensors are well known and readily adaptable to operate in a variable assist power steering system of the invention. See, for example, the torque transducer disclosed in U.S. Pat. No. 5,307,892.

Figure 2:
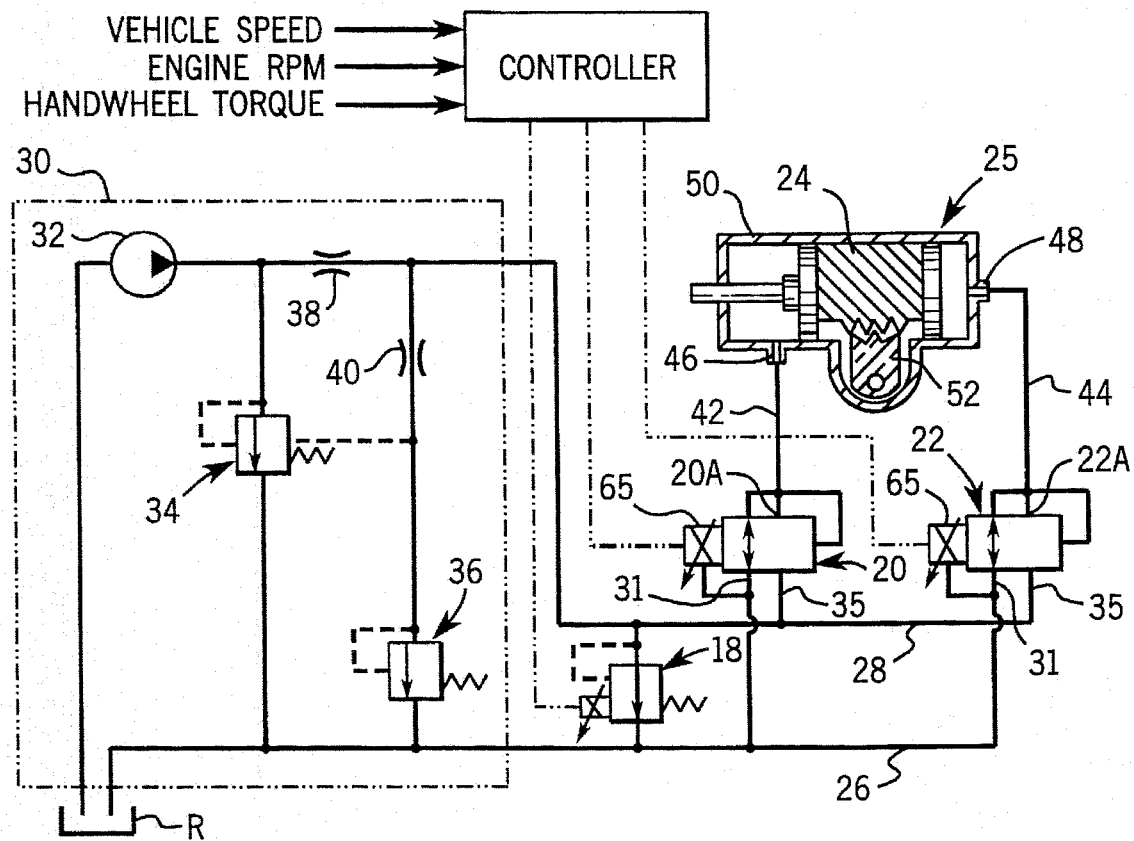
FIG. 2 is a schematic circuit diagram of a variable assist power steering system of the invention.

The controller 10 has the capability to output a control signal to a working pressure valve 18, a right direction valve 20 and to a left direction valve 22 (see FIG. 2). The valves 18, 20 and 22 are each electro-hydraulic pressure control valves which are pulse width modulated (PWM) valves such that the pressure drop across them may be controlled in proportion to the modulation ratio (MR) of the electrical signal applied to them. PWM valves are well known and any suitable type may be employed. For example, the valve 18 may be of the type disclosed in commonly assigned U.S. Pat. No. 5,328,147 which issued Jul. 12, 1994, the disclosure of which is hereby incorporated by reference.

The valve 18 is preferably of the type that when a minimal pressure is applied to its inlet, it opens, assuming no electrical signal is applied to it. Such is the type of valve disclosed in U.S. Pat. No. 5,328,147. Thus, for valve 18, the application of a PWM signal to valve 18 tends to close the valve.

Valves 20 and 22, on the other hand, are preferably normally closed valves. Thus, the application of PWM signals to these valves tends to open them. The valves 20 and 22 are preferably proportional pressure reducing and relieving valves so that when they are operated by appropriate PWM signals they reduce the pressure applied to them to supply their loads. Any suitable type of proportional pressure reducing and relieving valve may be used as the valves 20 and 22. One suitable type is disclosed in commonly assigned U.S. Pat. No. 5,377,720 which issued Jan. 3, 1995, the disclosure of which is hereby incorporated by reference.

In this case, the respective loads which the outputs 20A and 22A of the respective valves 20 and 22 are connected are the opposite sides of the rack piston 24 of standard automotive steering gear 25. When the valves 20 and 22 are de-energized, they return to their normal positions in which communication of the input pressure to the output side of the valve is cut off and the output side of the valve is connected with a relief pressure, identified by relief line 26 which is shown as connected to the reservoir R of the automotive power steering pump. As shown, valve 18 is also connected on its outlet side with relief line 26.

The inlet side of the valves 18, 20 and 22 are connected to a working pressure line 28. Working pressure line 28 is supplied with a flow of hydraulic fluid pressure from any suitable source. As shown in FIG. 2, the source is identified by dashed box 30, and includes the existing and conventional power steering pump 32 of the vehicle and typically a pump unloading valve 34 which bypasses excess flow from the pump 32 and a system pressure relief valve 36 which opens to relieve the output of source 30 should the pressure of the output become too great. Orifices 38 and 40 are also typically provided to further control the output of the source 30. However, it should be understood, that any source of pressurized hydraulic fluid may be used to operate a variable assist power steering system of the invention, including fixed and variable displacement sources.

Valve 18 is operated to continuously vary the working pressure in working pressure line 28 in response to changing vehicle status as characterized by the inputs vehicle speed, engine speed and handwheel torque. For example, when a system of the invention is triggered by the application of handwheel torque, the working pressure in line 28 is increased to a level appropriate for the vehicle speed and engine RPM. For example, "parking lot" maneuvers require maximum power assist at low vehicle speed and low engine RPM. However, minimal assist is desired at high vehicle speeds when "stiffer" handling is preferred. Moreover, for low vehicle speed but high engine RPM, for example in an off-road vehicle, less assist may in some circumstances be desirable.

The maximum amount of power assist available at any given time is directly proportional to the hydraulic working pressure in line 28. Since the working pressure in line 28 is also the input to the direction control valves 20 and 22, their operation and control is dependent in part on the working pressure in line 28, which is determined by the valve 18. Thus, there is a cooperative and dependent relationship between each valve 20 and 22 and the valve 18 which determines the amount of power assist experienced by the driver of the vehicle.

Valves 20 and 22 have their control ports 20A and 22A connected by lines 42 and 44 to opposite ports 46 and 48 of cylinder 50, in which rack piston 24 of the vehicle's steering gear is reciprocally slidable. Pinion 52, which is turned by the handwheel of the vehicle, meshes with rack piston 24 to affect movement in one direction or another of the piston 24, so as to steer the vehicle. Power assist is accomplished by providing a differential hydraulic pressure in the cylinder 50 across the piston 24, i.e., the pressure being higher at port 48 than at port 46 to assist in moving the piston 24 leftwardly, or the pressure being higher at port 46 than at port 48 to assist in moving the piston 24 rightwardly. Thus, for a given power assist, it is necessary to control both valves 20 and 22 so as to give the desired pressure differential across the piston 24.

A controller 10 capable of executing an algorithm for processing the vehicle speed, engine speed and handwheel torque inputs and outputting electrical signals for controlling the valves 18, 20 and 22 is well known in the art. Such a controller is preferably a microprocessor based system that may have built-in converters, such as frequency to analog converters, for converting the input signals to signals which are readable by the controller 10, if those signals are not already digitized. Also, preferably, the controller has high powered digital outputs and is capable of generating pulse width modulated drive signals for the valves 18, 20 and 22. The outputs should be provided with short circuit protection.

Typically, the controller can be easily adapted for various sizes and dynamics of vehicles by setting proper system parameters. The controller should have a non-volatile memory so that the system parameters can be stored. A communication port on the controller can be used to set these parameters through a standard personal computer. A controller such as this which is readily adaptable for use with the invention is available from Applied Power Inc. of Butler, Wisc.

Figure 3:
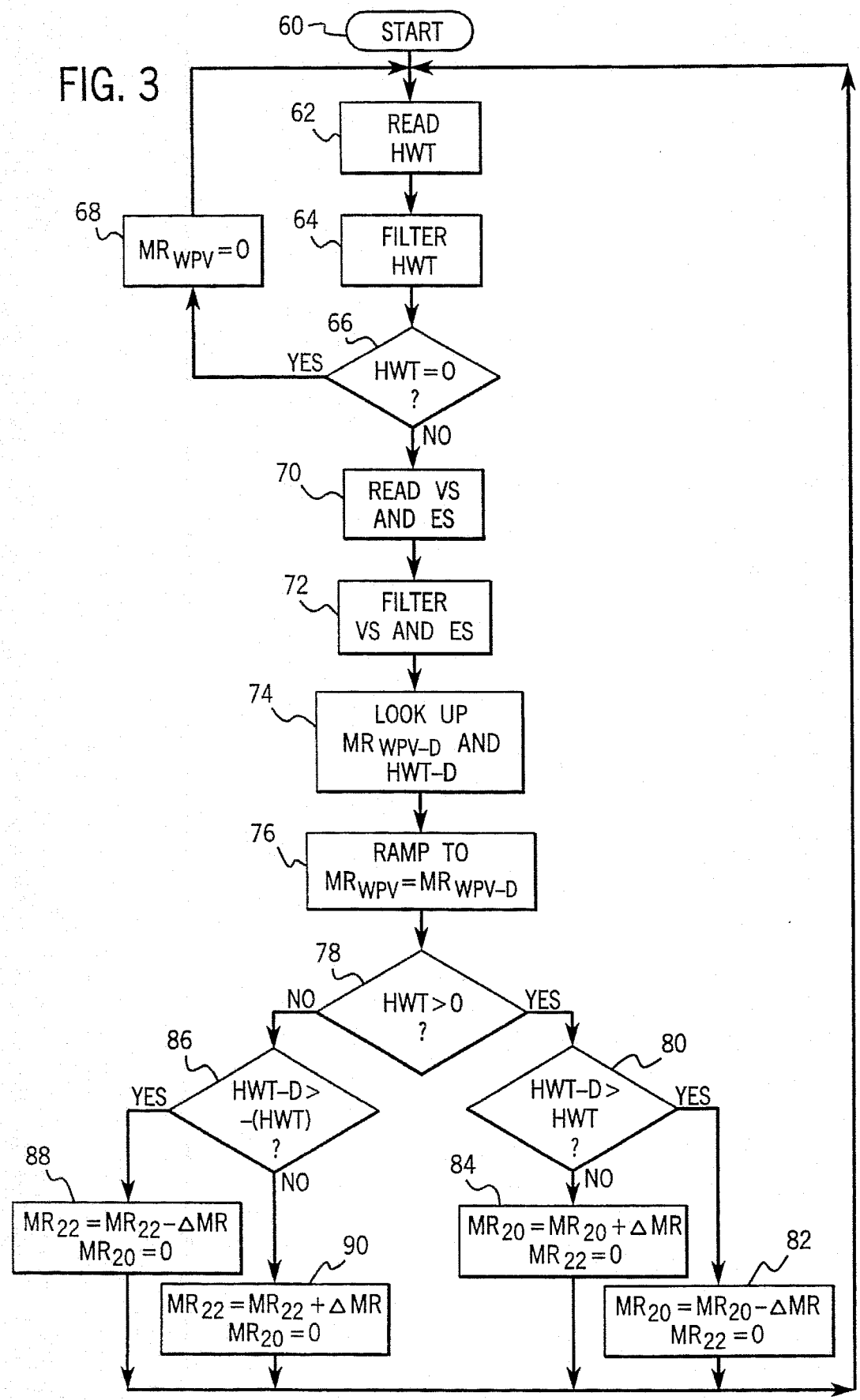
FIG. 3 is a schematic diagram of a flow chart illustrating an algorithm by which the controller of FIGS. 1 and 2 may be programmed to operate a variable assist power steering system of the invention.

An algorithm for execution by the controller to process the inputs and provide outputs to the valves 18, 20 and 22 is illustrated in FIG. 3. It should be noted that the invention is not limited to this particular algorithm, as other algorithms could be used for controlling the valves 18, 20 and 22.

In the algorithm illustrated in FIG. 3, after powering up (step 60), the handwheel torque (HWT) is read at step 62. Preferably, the current handwheel torque signal read at step 62 is filtered at step 64, for example by calculating a running average of the most recently polled handwheel torques. This may be accomplished for example by using a finite impulse response filter (FIR filter) such as by calculating a filtered torque signal for subsequent processing equal to the current torque signal plus the last three torque signals divided by four.

At step 66, it is determined whether the filtered handwheel torque signal is equal to 0, and if so the modulation ratios of each of the valves 18, 20 and 22 are set equal to 0 (i.e., they are turned off), following which the algorithm returns to step 62. If the handwheel torque is determined to not be equal to 0 at step 66, the algorithm proceeds to step 70 at which the vehicle speed (VS) and engine speed (ES) signals are read, followed by filtering those signals at step 72, for example by using an FIR filter similar to that described above, but using the most current respective speed signals.

Next, at step 74, the controller 10 compares the filtered vehicle speed and engine speed signals to a stored look-up table which relates vehicle speed and engine speed to desired values of handwheel torque (HWT-D) and modulation ratio of the valve 18 ($MR_{18}$-D). After the desired handwheel torque and valve 18 modulation ratio values (HWT-D and $MR_{18}$-D) are determined by this comparison, at step 76 the modulation ratio of the valve 18 ($MR_{18}$) is ramped to the desired value ($MR_{18}$-D).

Following step 76, at step 78 it is determined whether the filtered handwheel torque is greater than zero. A value greater than zero would indicate that the handwheel is being turned to the right (clockwise) and a value less than zero would indicate that the handwheel is being turned to the left (counterclockwise). According to the preferred embodiment, assist is always provided in the direction of turning. Thus, if during a right turn, pinion 52 moves piston 24 to the right as viewed in FIG. 2, assist would be provided by energizing valve 20 and deenergizing valve 22. On the other hand, assist to a left turn is provided by energizing valve 22 and deenergizing valve 20.

Accordingly, if step 78 is determined positively, it is determined whether the desired handwheel torque is greater than the filtered value of handwheel torque at step 80. If so, then it would indicate that the current amount of assist is too great, so at step 82 the modulation ratio of valve 20 ($MR_{20}$) is reduced by a certain value $\Delta MR$ so as to reduce the pressure at port 46. $\Delta MR$ is an incremental/decremental value chosen so as to effect smooth but rapid changes in the modulation ratio being incremented or decremented, taking into account processing speed and steering system response time. Also at step 82, the modulation ratio of valve 22 ($MR_{22}$) is set equal to 0, so that valve 22 is deenergized so as to connect port 48 with relief line 26.

If step 80 is determined negatively, then more assist is needed, which is effected at step 84 by incrementing $MR_{20}$ by $\Delta MR$ and setting $MR_{22}$ equal to zero. This increases the pressure at port 46 and connects port 48 to relief line 26. After either step 82 or 84, the algorithm returns to step 62 to start over.

If step 78 is determined negatively, then HWT is a negative value indicating the torque is leftward, the algorithm proceeds to step 86 at which it is determined whether HWT-D is greater than the negative of HWT, which would be a positive value. If so, at step 88 the modulation ratio of valve 22 ($MR_{22}$) is decremented by $\Delta MR$ so as to reduce the amount of power assist, and the modulation ration of valve 20 ($MR_{20}$) is set equal to 0 so as to establish (or keep established) communication between port 46 and relief line 26.

If step 86 is determined negatively, then at step 90 the modulation ratio of valve 22 is incremented by $\Delta MR$ so as to increase the amount of leftward assist and the modulation ratio of valve 20 is set equal to zero. After either of steps 88 and 90, the algorithm returns to step 62 to start over.

Many other control algorithms are possible. For example, at steps 82, 84, 88 and 90, rather than controlling the modulation ratios of the valves 20 and 22 by incrementing or decrementing them by a fixed amount $\Delta MR$, they could be incremented or decremented by an amount which is proportional to the difference between the desired handwheel torque and the absolute value of the actual filtered handwheel torque. In addition, the amount of modulation could be dependent on the integral or derivative of the handwheel torque, or the control scheme could be based on a method of adaptive control or fuzzy rules could be employed.

Thus, the invention provides a variable assist power steering system in which the working pressure available for assist is continuously controlled according to vehicle status parameters, which in the preferred embodiment are vehicle speed and engine speed. However, it is not necessary to practice aspects of the invention that these characteristics be used for controlling the system, since, for example, controlling the system based only on vehicle speed may in many applications be sufficient.

In addition, the invention provides a system in which not only the working pressure is controlled according to vehicle status, but directional valves having the working pressure at their inlets are controlled electrically to match a desired handwheel torque. The combination of the working pressure valve 18 and the directional valves 20 and 22 may be controlled using many different algorithms, and many other modifications and variations to the preferred embodiments described will be apparent to those skilled in the art. Therefore, the invention should not be limited to the embodiments described, but should be defined by the claims which follow.

We claim:

1. A variable assist power steering system for a motor vehicle, comprising:

hydraulic motor means for moving in either of two directions in response to two hydraulic pressure inputs, one of said inputs being for moving said motor in one direction and the other said input being for moving said motor in the other direction;

a source of hydraulic pressure for producing a source pressure;

a hydraulic working pressure line in communication with said source;

a pressure relief line;

means for sensing hand wheel torque and producing a hand wheel torque signal in response thereto;

an electro-hydraulic working pressure valve in communication with said working pressure line and said pressure relief line for variably controlling the hydraulic communication between said working pressure line and said pressure relief line so as to reduce said source pressure to a hydraulic working pressure in said working pressure line, said working pressure valve normally maintaining said working pressure at a relatively low relief pressure in said pressure relief line when said vehicle is not being steered and being actuable by an electrical signal input to increase said pressure to a working pressure level which is between said relief pressure and said source pressure in response to said hand wheel torque signal;

a pair of electro-hydraulic direction control valves in hydraulic communication with said working pressure line, each said motor input being in hydraulic communication with a different one of said direction control valves, each said direction control valve being selectively actuable by an electrical signal input to control the magnitude of pressure communicated from said working pressure line no a corresponding motor input; and a controller for generating electrical signals to actuate said working pressure valve and said direction control valves.

2. A variable assist power steering system as claimed in claim 1, wherein said direction control valves are in hydraulic communication with said pressure relief line.

3. A variable assist power steering system as claimed in claim 1, wherein electrical actuation of said working pressure valve closes said valve to increase said working pressure.

4. A variable assist power steering system as claimed in claim 1, wherein said working pressure is maintained at the pressure of said relief pressure line when said vehicle is not being steered.

* * * * *

UNITED STATES PATENT AND TRADEMARK OFFICE
CERTIFICATE OF CORRECTION

Patent No.   : 5,553,683
Dated        : September 10, 1996
Inventor(s)  : Craig E. Wenzel, et al.

It is certified that error appears in the above-identified patent and that said Letters Patent is hereby corrected as shown below:

Col. 6, line 49 (claim 1) change "no" to --to--.

Signed and Sealed this

Tenth Day of June, 1997

Attest:

BRUCE LEHMAN

Attesting Officer

Commissioner of Patents and Trademarks